(12) United States Patent
Ahn et al.

(10) Patent No.: US 9,265,069 B2
(45) Date of Patent: Feb. 16, 2016

(54) METHOD OF PERFORMING A RANDOM ACCESS PROCESS AND WIRELESS DEVICE USING SAME

(75) Inventors: Joon Kui Ahn, Anyang-si (KR); Jin Min Kim, Anyang-si (KR); Hyun Woo Lee, Anyang-si (KR); Suck Chel Yang, Anyang-si (KR); Dong Youn Seo, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 14/235,320

(22) PCT Filed: Aug. 10, 2012

(86) PCT No.: PCT/KR2012/006367
§ 371 (c)(1),
(2), (4) Date: Jan. 27, 2014

(87) PCT Pub. No.: WO2013/025009
PCT Pub. Date: Feb. 21, 2013

(65) Prior Publication Data
US 2014/0161089 A1 Jun. 12, 2014

Related U.S. Application Data

(60) Provisional application No. 61/522,694, filed on Aug. 12, 2011.

(51) Int. Cl.
| | | |
|---|---|---|
| *H04W 4/00* | (2009.01) | |
| *H04W 74/08* | (2009.01) | |
| *H04L 5/00* | (2006.01) | |
| *H04W 74/02* | (2009.01) | |

(52) U.S. Cl.
CPC ......... *H04W 74/0833* (2013.01); *H04L 5/0053* (2013.01); *H04W 74/02* (2013.01)

(58) Field of Classification Search
None
See application file for complete search history.

(56) References Cited

U.S. PATENT DOCUMENTS

| | | |
|---|---|---|
| 2010/0085956 A1 | 4/2010 | Ahn et al. |
| 2010/0226324 A1 | 9/2010 | Lee et al. |

(Continued)

FOREIGN PATENT DOCUMENTS

| | | |
|---|---|---|
| EP | 2309817 A1 | 4/2011 |
| KR | 10-2009-0094743 A | 9/2009 |

(Continued)

OTHER PUBLICATIONS

Interdigital Communications, "Support for RACH on SCells in LTE CA," 3GPP TSG-RAN WG2 #74, May 9-13, 2011, pp. 1-3, Tdoc R2-113258.

(Continued)

*Primary Examiner* — Anh-Vu Ly
(74) *Attorney, Agent, or Firm* — Birch, Stewart, Kolasch & Birch, LLP

(57) ABSTRACT

Provided are a method of performing a random access process and wireless device using same in a wireless communication system. A first random access process and a second random access process are triggered in one subframe, and a wireless device selects one of the first random access process and the second random access process. The wireless device transmits a random access preamble on the selected random access process from the one subframe to a base station.

6 Claims, 9 Drawing Sheets

(56) References Cited

U.S. PATENT DOCUMENTS

| | | |
|---|---|---|
| 2010/0227636 A1 | 9/2010 | Kwon et al. |
| 2010/0255847 A1 | 10/2010 | Lee et al. |
| 2010/0296467 A1* | 11/2010 | Pelletier et al. ............... 370/329 |
| 2011/0170503 A1 | 7/2011 | Chun et al. |
| 2011/0267993 A1 | 11/2011 | Seo et al. |
| 2012/0063302 A1* | 3/2012 | Damnjanovic et al. ....... 370/228 |
| 2012/0176967 A1* | 7/2012 | Kim et al. ..................... 370/328 |
| 2012/0300714 A1* | 11/2012 | Ng et al. ........................ 370/329 |
| 2013/0010711 A1* | 1/2013 | Larsson et al. ................ 370/329 |
| 2013/0028204 A1* | 1/2013 | Dinan ............................ 370/329 |
| 2014/0293915 A1* | 10/2014 | Pelletier et al. ............... 370/329 |
| 2014/0369322 A1* | 12/2014 | Fwu et al. ..................... 370/336 |

FOREIGN PATENT DOCUMENTS

| | | |
|---|---|---|
| KR | 10-2010-0059792 A | 6/2010 |
| KR | 10-2010-0082291 A | 7/2010 |

OTHER PUBLICATIONS

Nokia Corporation et al., "RACH and carrier aggregation," 3GPP TSG-RAN WG2 Meeting #68bis, Jan. 18-22, 2010, 4 pages, R2-100372.

Sharp, "Considerations for RACH initiation on SCell," 3GPP TSG-RAN WG2#74, May 9-13, 2011, pp. 1-3, R2-113050.

* cited by examiner

METHOD OF PERFORMING A RANDOM ACCESS PROCESS AND WIRELESS DEVICE USING SAME

CROSS REFERENCE TO RELATED APPLICATIONS

This application is the National Phase of PCT/KR2012/006367 filed on Aug. 10, 2012, which claims priority under 35 U.S.C. 119(e) to U.S. Provisional Application No. 61/522,694 filed on Aug. 12, 2011, all of which are hereby expressly incorporated by reference into the present application.

TECHNICAL FIELD

The present invention relates to wireless communication, and more particularly, to a method of performing a random access procedure in a wireless communication system, and a wireless device using the method.

BACKGROUND ART

Long term evolution (LTE) based on $3^{rd}$ generation partnership project (3GPP) technical specification (TS) release 8 is a promising next-generation mobile communication standard. Recently, LTE-advanced (LTE-A) based on 3GPP TS release 10 supporting multiple carriers is under standardization.

Multiple carriers are supported starting from 3GPP LTE-A, and such a technique is called a carrier aggregation. One carrier corresponds to one cell, and as a result, a user equipment can receive a service from a plurality of serving cells in a multiple-carrier system.

A random access procedure is used to maintain an uplink time alignment between a base station and a user equipment or to deliver a scheduling request. In general, the random access procedure includes transmission of a random access preamble and reception of a random access response.

It has been conventionally considered that the random access procedure is performed only in one cell. However, with the introduction of a plurality of serving cells, there is a need to design a random access procedure performed in the plurality of serving cells.

DISCLOSURE OF THE INVENTION

The present invention provides a method of performing a random access when a plurality of random access procedures are triggered simultaneously, and a wireless device using the method.

In one aspect, there is provided a method of performing a random access procedure in a wireless communication system. The method may comprise: selecting one of a first random access procedure and a second random access procedure if the first random access procedure and the second random access procedure are triggered in a single subframe; and transmitting to a base station a random access preamble for the selected random access procedure in the single subframe.

The first random access procedure may be triggered by an order of the base station, and the second random access procedure may be triggered by a medium access control (MAC) layer.

The first random access procedure and the second random access procedure may be triggered in different serving cells.

In other aspect, there is provided a wireless device for performing a random access procedure in a wireless communication system. The wireless device may comprise: a radio frequency (RF) unit for transmitting and receiving a radio signal; and a processor operatively coupled to the RF unit, wherein the processor is configured to: select one of a first random access procedure and a second random access procedure if the first random access procedure and the second random access procedure are triggered in a single subframe; and transmit to a base station a random access preamble for the selected random access procedure in the single subframe.

A method of selectively performing a random access procedure is proposed when a plurality of random access procedures are triggered.

MODES FOR CARRYING OUT THE PREFERRED EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks.

Figure 1:
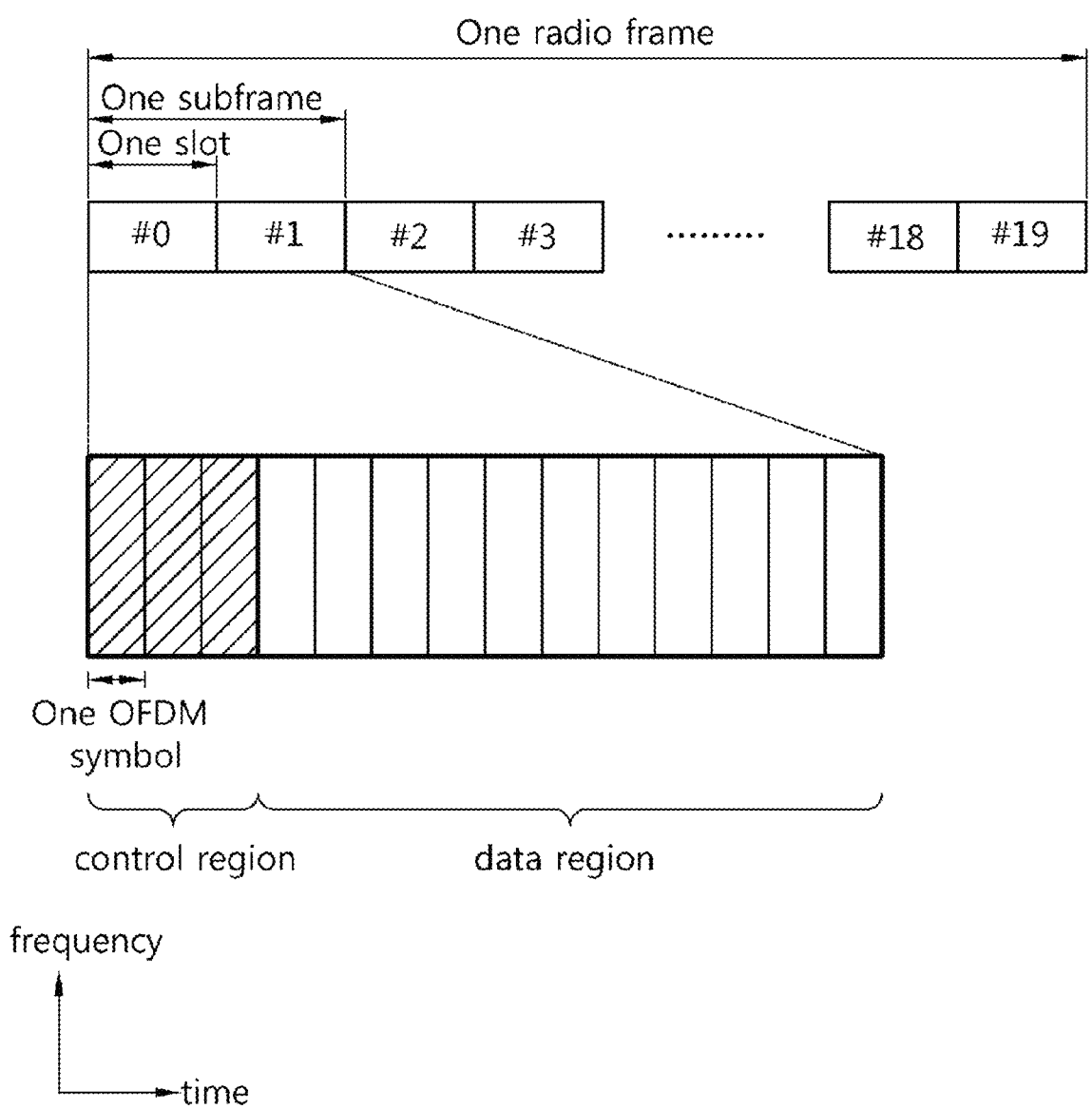
FIG. 1 shows a structure of a downlink radio frame in $3^{rd}$ generation partnership project (3GPP) long term evolution-advanced (LTE-A).

FIG. 1 shows a structure of a downlink radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

A UL subframe may be divided into a control region and a data region. The control region is a region to which a physical uplink control channel (PUCCH) carrying UL control information is allocated. The data region is a region to which a physical uplink shared channel (PUSCH) carrying user data is allocated.

Now, a DL control channel is described.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH). In addition, a control signal transmitted in a physical layer may be a primary synchronization signal (PSS), a secondary synchronization signal (SSS), and a random access preamble.

The PSS is transmitted in last OFDM symbols of a $1^{st}$ slot (or a $1^{st}$ subframe (i.e., a subframe with an index 0) and an $11^{th}$ slot (or a $6^{th}$ subframe (i.e., a subframe with an index 5). The PSS is used to attain OFDM symbol synchronization or slot synchronization, and is in association with a physical cell identify (ID). A primary synchronization code (PSC) is a sequence used for the PSS. There are three PSCs in the 3GPP LTE. One of the three PSCs is transmitted using the PSS according to the cell ID. The same PSC is used for each of the last OFDM symbols of the $1^{st}$ slot and the $11^{th}$ slot.

The SSS includes a $1^{st}$ SSS and a $2^{nd}$ SSS. The $1^{st}$ SSS and the $2^{nd}$ SSS are transmitted in an OFDM symbol adjacent to an OFDM symbol in which the PSS is transmitted. The SSS is used to attain frame synchronization. The SSS is used to attain a cell ID together with the PSS. The $1^{st}$ SSS and the $2^{nd}$ SSS use different secondary synchronization codes (SSCs). If the $1^{st}$ SSS and the $2^{nd}$ SSS each include 31 subcarriers, sequences of two SSCs with a length of 31 are respectively used for the $1^{st}$ SSS and the $2^{nd}$ SSS.

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state may use one CCE in PDCCH transmission. A wireless device having a poor DL channel state may use 8 CCEs in PDCCH transmission.

A control channel consisting of one or more CCEs performs interleaving on an REG basis, and is mapped to a physical resource after performing cyclic shift based on a cell identifier (ID).

Figure 2:
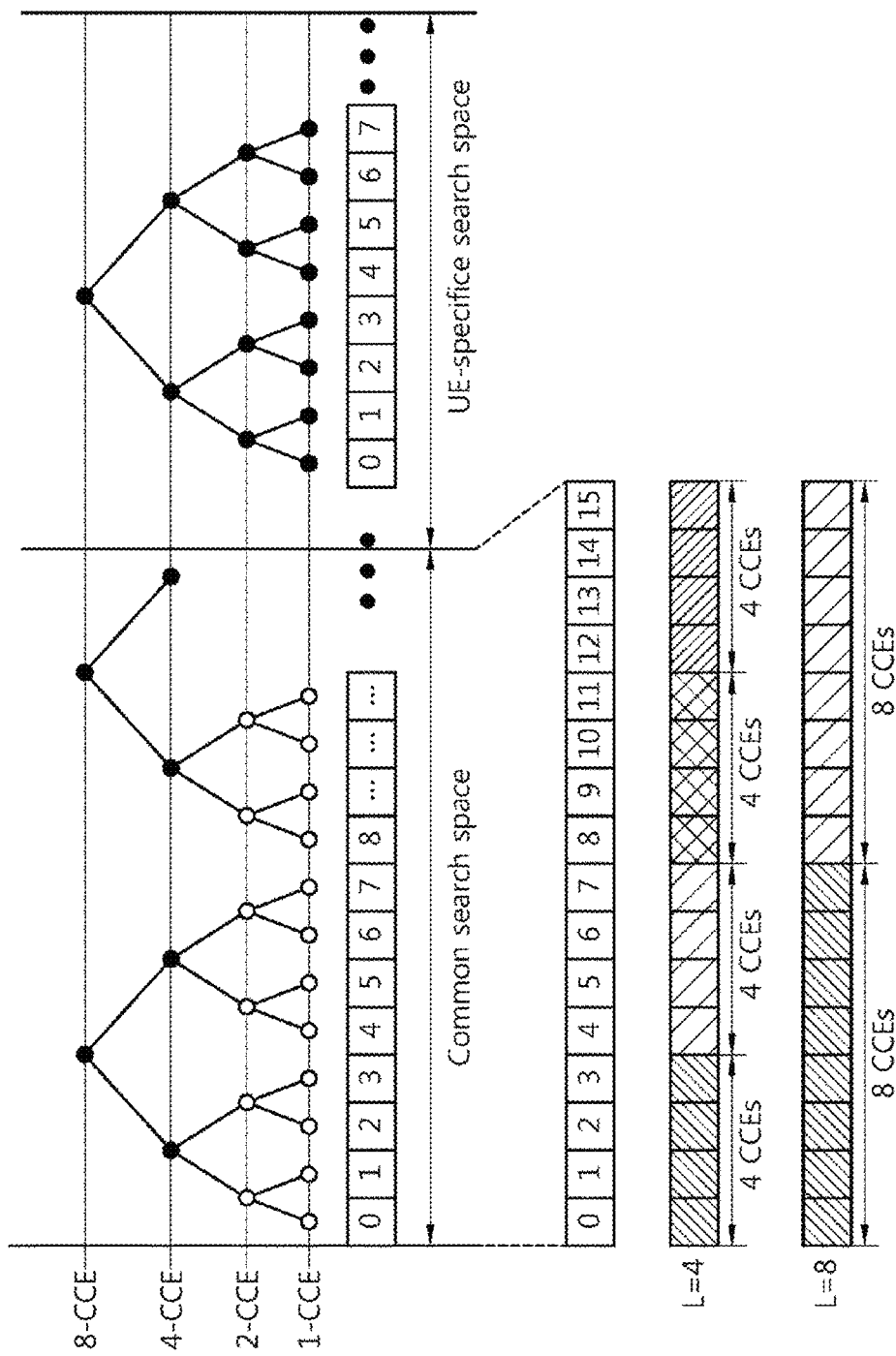
FIG. 2 shows an example of monitoring a physical downlink control channel (PDCCH).

FIG. 2 shows an example of monitoring a PDCCH. The section 9 of 3GPP TS 36.213 V10.2.0 (2011-06) may be incorporated herein by reference.

The 3GPP LTE uses blind decoding for PDCCH detection. The blind decoding is a scheme in which a desired identifier is de-masked from a CRC of a received PDCCH (referred to as a PDCCH candidate) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs may be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space may also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information may also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, |
|  | 2 | 12 | 6 | 1B, 1D, 2, 2A |
|  | 4 | 8 | 2 |  |
|  | 8 | 16 | 2 |  |
| Common | 4 | 16 | 4 | 0, 1A, 1C, |
|  | 8 | 16 | 2 | 3/3A |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level LE {1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \quad \text{[Equation 1]}$$

Herein, i=0, 1, ..., L−1, m=0, ..., $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the wireless device, m'=m+$M^{(L)}n_{ci}$. Herein, $n_{ci}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1} = n_{RNTI} \neq 0$, A=39827, D=65537, k=floor($n_s$/2), and $n_s$ denotes a slot number in a radio frame.

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Now, a multiple carrier system is described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (also referred to as bandwidth aggregation or carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC may be mapped to one cell. Therefore, when a wireless device communicates with a BS through a plurality of DL CCs, it can be said that the wireless device receives a service from a plurality of serving cells.

Figure 3:
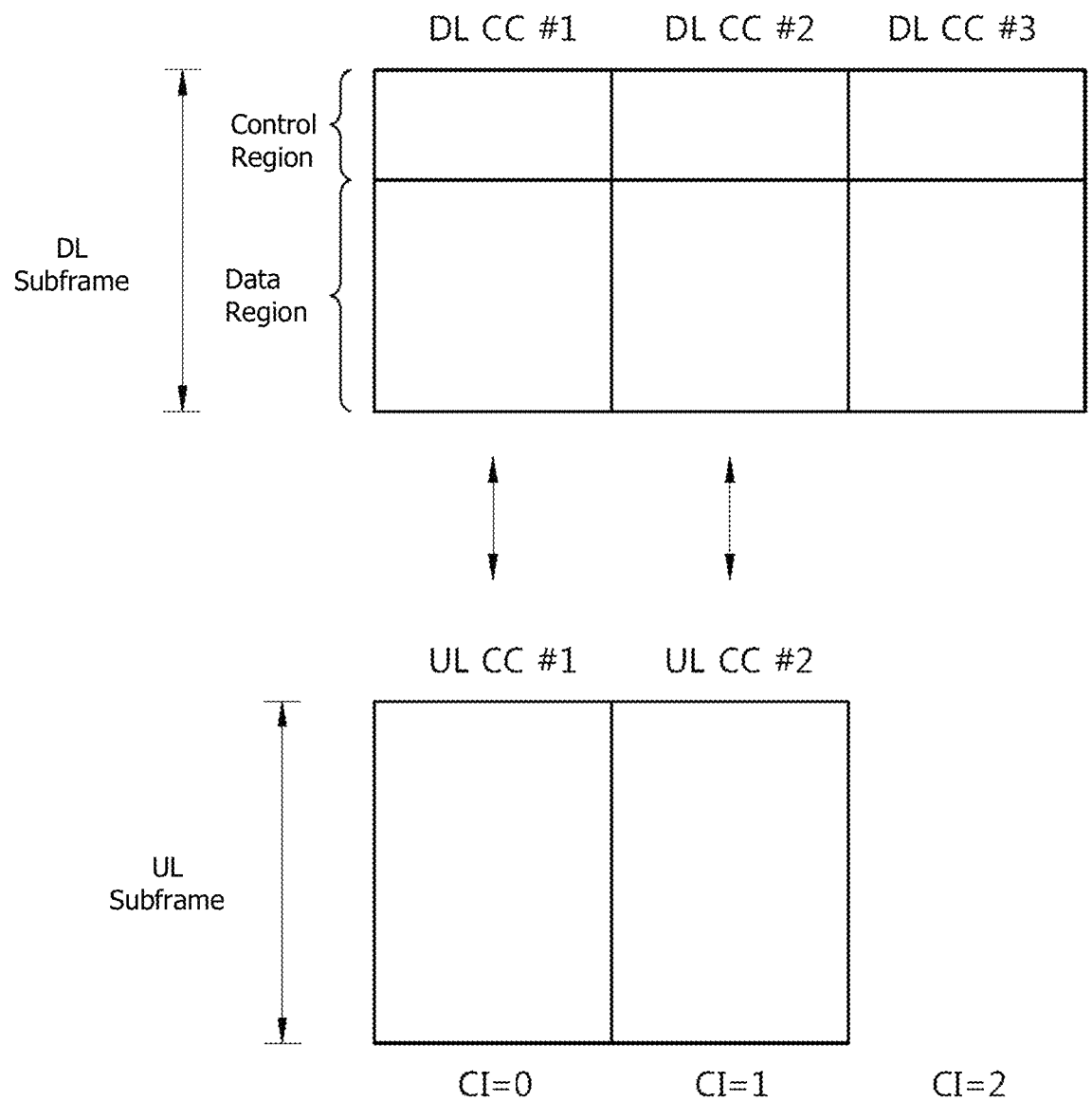
FIG. 3 shows an example of multiple carriers.

FIG. 3 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that the wireless device receives a service from three serving cells.

The wireless device may monitor the PDCCH in a plurality of DL CCs, and may receive a DL transport block simultaneously via the plurality of DL CCs. The wireless device may transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell may be identified by using a cell index (CI). The CI may be cell-specific or UE-specific. Herein, CI=0, 1, 2 are assigned to the $1^{st}$ to $3^{rd}$ serving cells for example.

The serving cell may be classified into a primary cell and a secondary cell. The primary cell operates at a primary frequency, and is a cell designated as the primary cell when the wireless device performs an initial network entry process or starts a network re-entry process or performs a handover process. The primary cell is also called a reference cell. The secondary cell operates at a secondary frequency. The secondary cell may be configured after a radio resource control (RRC) connection is established, and may be used to provide an additional radio resource. At least one primary cell is configured always. The secondary cell may be added/modified/released by using higher-layer signaling (e.g., RRC messages).

The CI of the primary cell may be fixed. For example, a lowest CI may be designated as a CI of the primary cell. It is assumed hereinafter that the CI of the primary cell is 0 and a CI of the secondary cell is allocated sequentially starting from 1.

The UE may monitor a PDCCH through a plurality of serving cells. However, even if there are N serving cells, the BS may be configured to monitor the PDCCH for M (M≤N) serving cells. In addition, the BS may be configured to preferentially monitor the PDCCH for L (L≤M≤N) serving cells.

The multiple carrier system can use two types of scheduling.

First, according to per-CC scheduling, PDSCH scheduling is performed only in each serving cell. A PDSCH of a primary cell is scheduled in a PDCCH of the primary cell, and a PDSCH of a secondary cell is scheduled in a PDCCH of the secondary cell. Accordingly, a PDCCH-PDSCH structure of the conventional 3GPP LTE may be directly used.

Second, according to cross-CC scheduling, a PDCCH of each serving cell may schedule not only its PDSCH but also a PDSCH of another serving cell.

A serving cell in which the PDCCH is transmitted is called a scheduling cell, and a serving cell in which the PDSCH to be scheduled is transmitted through the PDCCH of the scheduling cell is called a scheduled cell. The scheduling cell may also be called a scheduling CC, and the scheduled CC may also be called a scheduled CC. According to the per-CC scheduling, the scheduling cell and the scheduled cell are identical. According to the cross-CC scheduling, the scheduling cell and the scheduled cell may be identical or different.

For the cross-CC scheduling, a carrier indicator field (CIF) is introduced in DCI. The CIF includes a CI of a cell having a PDSCH to be scheduled. It can be said that the CIF indicates a CI of a scheduled cell. According to the per-CC scheduling, the CIF is not included in DCI of a PDCCH. According to the cross-CC scheduling, the CIF is included in the DCI of the PDCCH.

The BS may configure the per-CC scheduling or the cross-CC scheduling in a cell-specific or UE-specific manner. For example, the BS may configure the cross-CC scheduling to a specific UE by using a higher layer message such as an RRC message.

Even if there are a plurality of serving cells, the BS may monitor the PDCCH only in a specific serving cell to decrease a load of blind decoding. A cell activated to monitor the PDCCH is called an activated cell (or a monitoring cell).

Figure 4:
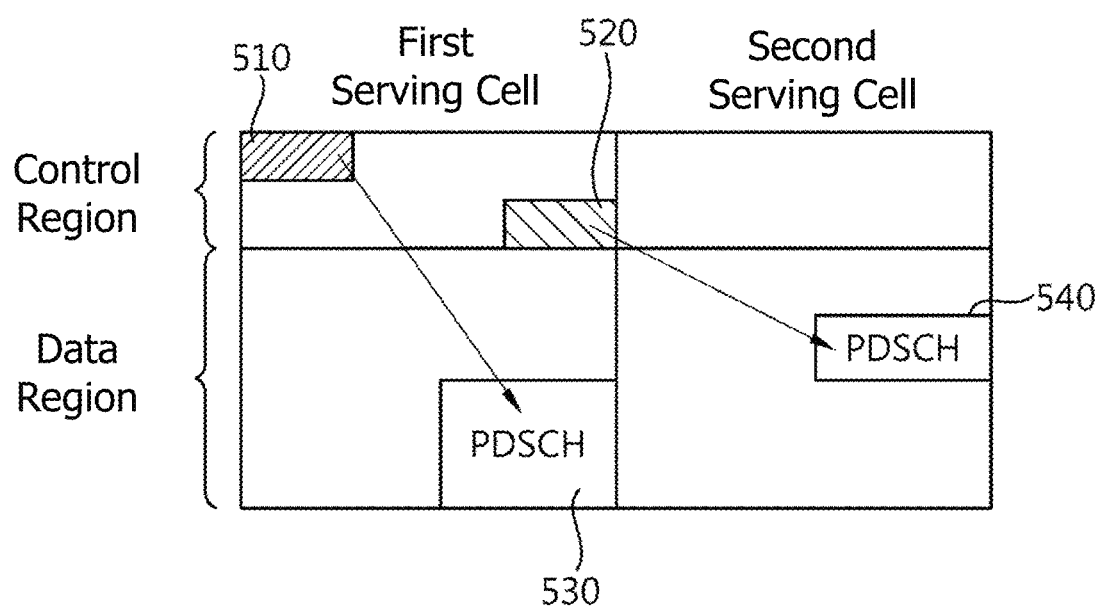
FIG. 4 shows an example of cross-component carrier (CC) scheduling.

FIG. 4 shows an example of cross-CC scheduling.

A UE detects a PDCCH 510. Then, on the basis of DCI on the PDCCH 510, the UE receives a DL transport block on a PDSCH 530. Even if the cross-CC scheduling is configured, a PDCCH-PDSCH pair in the same cell may be used.

The UE detects a PDCCH 520. Assume that a CIF included in DCI on the PDCCH 520 indicates a second serving cell. The UE receives a DL transport block on a PDSCH 540 of the second serving cell.

Now, a random access procedure is described.

Figure 5:
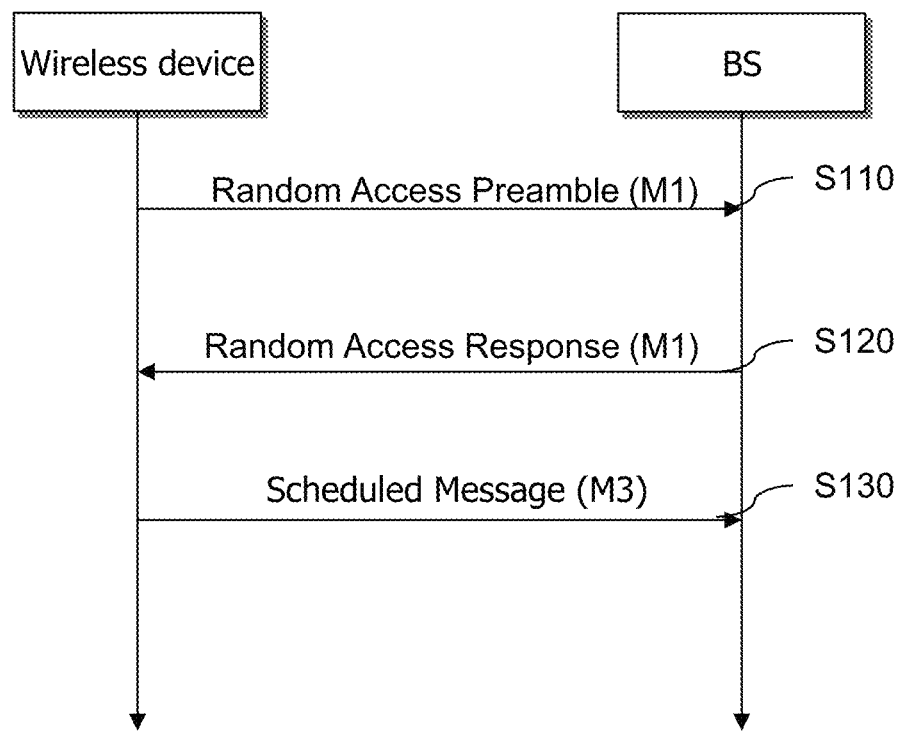
FIG. 5 is a flowchart showing a random access procedure in 3GPP LTE/LTE-A.

FIG. 5 is a flowchart showing a random access procedure in 3GPP LTE/LTE-A.

A wireless device receives a root index and a physical random access channel (PRACH) configuration index from a BS. Each cell has 64 candidate random access preambles defined by a Zadoff-Chu (ZC) sequence. The root index is a logical index for generating the 64 candidate random access preambles by the wireless device.

The random access preamble is limited to a specific time and frequency resource for each cell. The PRACH configuration index indicates a specific subframe and preamble format capable of transmitting the random access preamble.

Table 2 below shows an example of the random access configuration disclosed in the section 5.7 of 3GPP TS 36.211 V8.7.0 (2009-05).

TABLE 2

| PRACH configuration index | Preamble format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

The wireless device transmits a randomly selected random access preamble to the BS (step S110). The wireless device selects one of the 64 candidate random access preambles. In addition, the wireless device selects a corresponding subframe by using the PRACH configuration index. The wireless device transmits the selected random access preamble in the selected subframe.

Upon receiving the random access preamble, the BS transmits a random access response (RAR) to the wireless device (step S120). The RAR is detected in two steps. First, the wireless device detects a PDCCH masked with a random access-RNTI (RA-RNTI). The wireless device receives the RAR included in a medium access control (MAC) protocol data unit (PDU) through a PDCCH indicated by the detected PDCCH.

Figure 6:
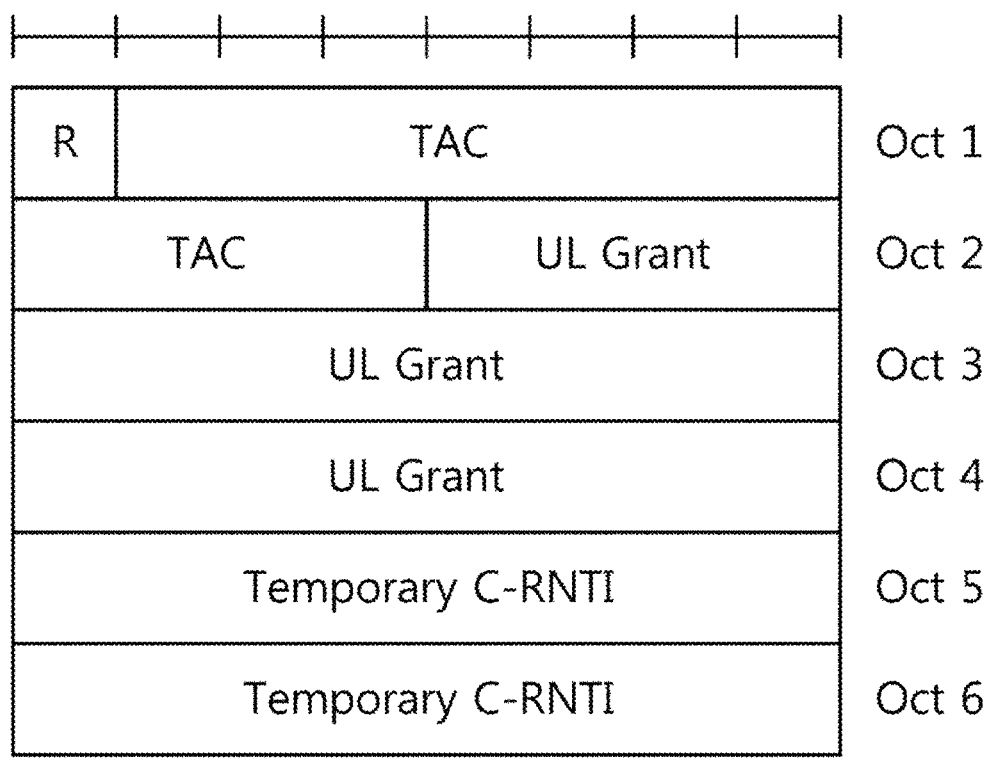
FIG. 6 shows an example of a random access response.

FIG. 6 shows an example of a random access response (RAR).

The RAR may include a timing advance command (TAC), a UL grant, and a temporary C-RNTI.

The TAC is information indicating a time alignment value sent by a BS to a wireless device to maintain a UL time alignment. The wireless device updates UL transmission timing by using the time alignment value. When the wireless device updates the time alignment, a time alignment timer starts or restarts. The wireless device may perform UL transmission only when the time alignment timer is running.

The UL grant is a UL resource used in transmission of a scheduling message described below.

Referring back to FIG. 5, the wireless device transmits a scheduled message to the BS according to a UL grant included in the RAR (step S130).

Hereinafter, the random access preamble, the RAR, and the scheduled message may also be called messages M1, M2, and M3, respectively.

The random access procedure may be triggered by at least one of the followings.

(1) Triggering by a MAC layer: The MAC layer of the wireless device may trigger the random access procedure to request UL scheduling. Hereinafter, the random access procedure triggered by the MAC layer is called a MAC-random access procedure.

(2) Triggering by a PDCCH order: A BS may instruct the wireless device to start the random access procedure due to a cause of UL time alignment or the like. The random access procedure is triggered when a specific field masked with a C-RNTI and having a DCI format 1A is set to a specific value. The PDCCH order may enable per-CC scheduling or cross-CC scheduling. Hereinafter, a random access procedure triggered by an order of the BS is called a PDCCH-random access procedure. The PDCCH-random access procedure may transmit a randomly selected random access preamble, or may transmit a dedicated random access preamble.

In 3GPP LTE/LTE-A, there is a restriction in that the random access procedure is performed only through a primary cell even if the wireless device has a plurality of serving cells. Both of the MAC-random access procedure and the PDCCH-random access procedure are performed only in the primary cell.

However, if frequency bands of the plurality of serving cells are separated from one another, a primary cell and a second cell may have different frequency features, and thus a random access procedure for UL time alignment may also need to be performed in the secondary cell.

In addition, although it is assumed in 3GPP LTE/LTE-A that the plurality of serving cells are managed by one BS, it is also possible to consider a case where the plurality of serving cells are managed by a plurality of BSs. This implies that the wireless device has a plurality of MAC layers. When the plurality of MAC layers operate independently, there may be a case where a plurality of random access procedures are simultaneously triggered by the plurality of MAC layers in the same time point (i.e., the same subframe).

Figure 7:
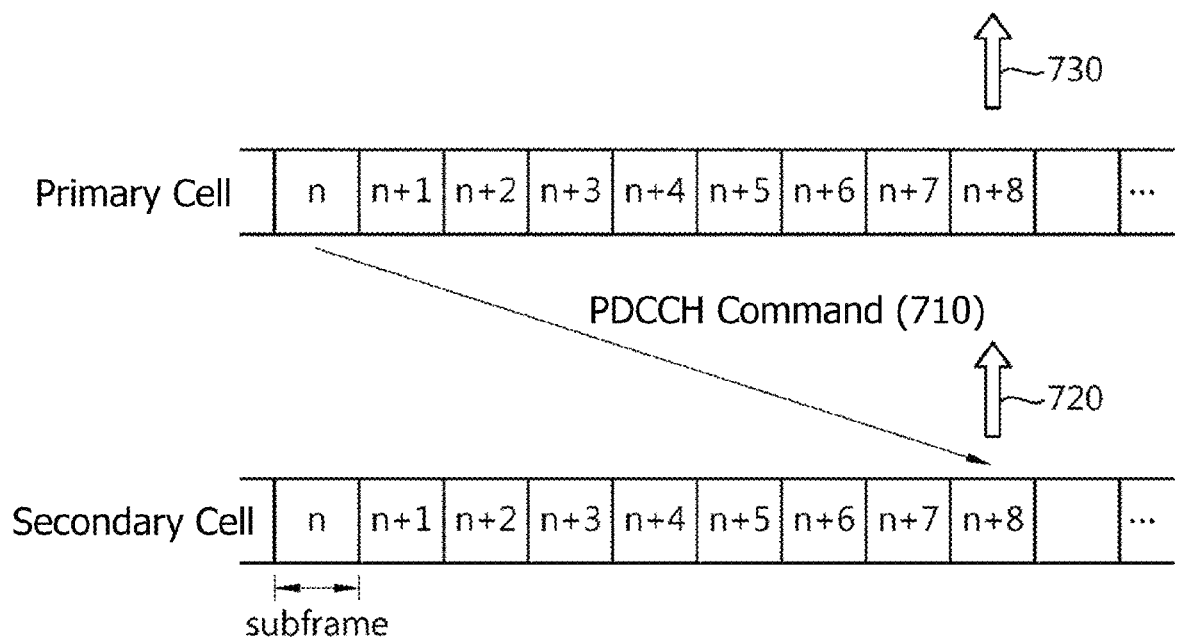
FIG. 7 shows an example of triggering a plurality of random access procedures.

FIG. 7 shows an example of triggering a plurality of random access procedures.

In a subframe n, a PDCCH-random access procedure of a secondary cell is triggered in a primary cell by a PDCCH order 710. This is for a BS to acquire UL timing information of the secondary cell. The PDCCH-random access procedure starts in a first subframe n+k (k>=6). The subframe n+k is a UL subframe which satisfies a PRACH configuration. It is assumed herein that a first random access preamble 720 for the PDCCH-random access procedure is transmitted in a subframe n+8.

Meanwhile, in addition to the PDCCH-random access procedure, it is also assumed that a second random access preamble 730 for a MAC-random access procedure is transmitted for a scheduling request in the subframe n+8.

A plurality of serving cells and/or a plurality of MAC layers may lead to various situations in which transmission of a plurality of random access preambles starts in the same subframe.

The present invention proposes to perform one selected random access procedure even if the plurality of random access procedures are triggered in the same subframe as described above. In doing so, simultaneous transmission of the plurality of random access preambles can be avoided. This is because excessive UL transmit power is consumed to transmit the plurality of random access preambles, and implementation of the wireless device and the network may become complicated.

Figure 8:
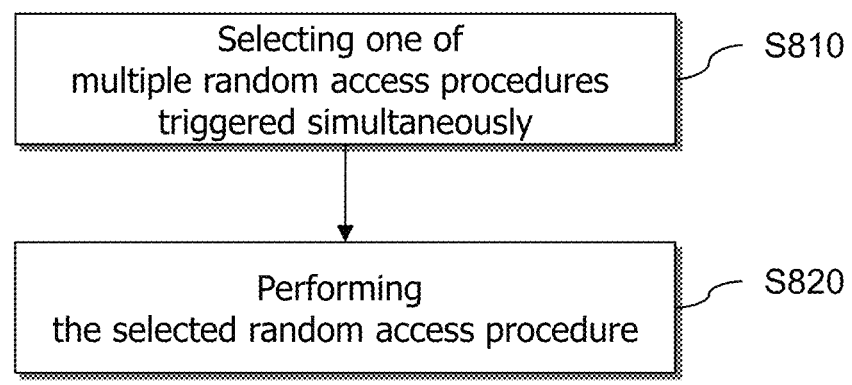
FIG. 8 is a flowchart showing a method of performing a random access according to an embodiment of the present invention.

FIG. 8 is a flowchart showing a method of performing a random access according to an embodiment of the present invention.

In step S810, a wireless device selects one of a plurality of random access procedures triggered simultaneously. For example, a first random access procedure and a second random access procedure may be triggered in one subframe. Although it is considered hereinafter that two random access procedures are simultaneously triggered, the number of random access procedures to be triggered is not limited thereto.

The plurality of random access procedures to be triggered may be classified according to a triggering cause, a dedicated random access preamble assignment, a serving cell to be triggered, and a combination of them.

The first and second random access procedure may have different triggering causes. For example, the first random access procedure may be a PDCCH-random access procedure triggered by the aforementioned BS order, and the second random access procedure may be a MAC-random access procedure triggered by a MAC layer of the wireless device.

The first random access procedure may be a non-contention based random access procedure which uses a pre-assigned dedicated random access preamble, and the second random access procedure may be a contention based random access procedure which uses a randomly selected random access preamble. The PDCCH-random access procedure may be the non-contention based random access procedure or the contention based random access procedure. In addition, the MAC-random access procedure may be the non-contention based random access procedure or the contention based random access procedure.

The first and second random access procedure may be triggered in different serving cells. The serving cell to be triggered may include at least any one of a serving cell for transmitting a random access preamble and a serving cell for receiving a random access response. For example, the first random access procedure may be triggered in the secondary cell, and the second random access procedure may be triggered in the primary cell.

In step S820, the wireless device performs the selected random access procedure. Assume that the first random access procedure is selected between the first random access procedure and the second random access procedure. The wireless device may transmit a random access preamble for the first random access procedure to the BS in the aforementioned single subframe.

Now, a criterion of selecting one of a plurality of random access procedures triggered simultaneously is described.

For clarity, it is assumed that two random access procedures are triggered simultaneously. Herein, a first random access procedure is a PDCCH-random access procedure, and a second random access procedure is a MAC-random access procedure. However, this is for exemplary purposes only, and thus there is no restriction on the number of random access procedures to be triggered or a triggering cause.

In a first embodiment, the MAC-random access procedure may be discarded (or stopped), and only the PDCCH-random access procedure may be performed.

Since a BS intends to acquire UL timing information of a corresponding cell through a PDCCH order, the PDCCH-random access procedure is assigned a higher priority than the MAC-random access procedure. This is because, even if the wireless device give up to perform the MAC-random access procedure for a scheduling request, a buffer status report (BSR) can be transmitted through scheduled PUSCH transmission.

In a second embodiment, the MAC-random access procedure may be delayed, and the PDCCH-random access procedure may be first performed.

Assume that a PDCCH order is received in a subframe n, and a random access preamble for the PDCCH-random access procedure is transmitted in a subframe n+k (k>=6). The subframe n+k is a first subframe which satisfies a random access configuration. In this case, even if the MAC-random access procedure is triggered in the subframe n+k, a random access preamble for the MAC-random access procedure is not transmitted. The random access preamble for the MAC-random access procedure may be transmitted in a first subframe which satisfies the random access configuration after the subframe n+k.

Alternatively, the random access preamble for the MAC-random access procedure may be transmitted in the first subframe which satisfies the random access configuration after the PDCCH-random access procedure is complete. Herein, the 'after the PDCCH-random access procedure is complete' may imply 'after an M2 message is received' or 'after an M3 message is transmitted'. This is to avoid unnecessary overlapping of the random access procedures.

In doing so, there may be an advantage when the plurality of random access procedures are triggered in a plurality of MAC layers. This is because delaying may be more effective in terms of buffer management than discarding a random access procedure having a low priority.

In a third embodiment, the PDCCH-random access procedure may be discarded (or stopped), and only the MAC-random access procedure may be performed.

The MAC-random access procedure triggered by the MAC layer of the wireless device is necessary to perform direct data communication. Therefore, an increase in a latency for a case of performing data communication may have a greater effect to a user than an increase in a latency for a case of acquiring UL timing. Accordingly, the MAC-random access procedure may be assigned a higher priority than the PCCH-random access procedure.

If the random access preamble for the PDCCH-random access procedure is not received in a corresponding subframe, the BS may transmit a new PDCCH order to the wireless device.

In a fourth embodiment, the PDCCH-random access procedure may be delayed, and the MAC-random access procedure may be first performed.

Assume that a PDCCH order is received in a subframe n, and the PDCCH-random access procedure is triggered in a subframe n+k (k>=6). The subframe n+k is a first subframe which satisfies a random access configuration. In this case, even if the PDCCH-random access procedure is triggered in the subframe n+k, if the MAC-random access procedure is triggered, a random access preamble for the MAC-random access procedure is transmitted in the subframe n+k. Subsequently, the wireless device may transmit a random access preamble for the PDCCH-random access procedure in a first subframe which satisfies the random access configuration after the subframe n+k.

Alternatively, the random access preamble for the PDCCH-random access procedure may be transmitted in the first subframe which satisfies the random access configuration after the MAC-random access procedure is complete. Herein, the 'after the MAC-random access procedure is complete' may imply 'after an M2 message is received' or 'after an M3 message is transmitted'. This is to avoid unnecessary overlapping of the random access procedures.

If the random access preamble for the PDCCH-random access procedure is a dedicated random access preamble, the BS may assign the dedicated random access preamble by considering the delay of the PDCCH-random access procedure.

In the aforementioned embodiment, the 'simultaneous' triggering of the plurality of random access procedures implies that a transmission time of the plurality of random access preambles overlaps partially or entirely.

When it is said that the PDCCH-random access procedure and the MAC-random access procedure are triggered simultaneously, it may include a case where the MAC-random access procedure is triggered before a corresponding random access preamble is received after a PDCCH order is received. For example, assume that the PDCCH order is received in a subframe n, and a PDCCH-random access procedure is triggered in a subframe n+k (k>=6). When the MAC-random access procedure is triggered in a subframe n+4, one of the aforementioned first to fourth embodiments may be applied.

The PDCCH-random access procedure may include a random access procedure which is triggered by using various mechanisms as well as by the PDCCH order. The MAC-random access procedure may include a random access procedure triggered by the wireless device autonomously as well as by the MAC layer.

The PDCCH-random access procedure and the MAC-random access procedure may be related to a serving cell to be triggered. For example, the PDCCH-random access procedure may include a random access procedure triggered by the BS in a secondary cell. The MAC-random access procedure may include a random access procedure triggered by the wireless device in a primary cell.

The PDCCH-random access procedure may include a non-contention based random access procedure, and the MAC-random access procedure may include a contention based random access procedure.

Figure 9:
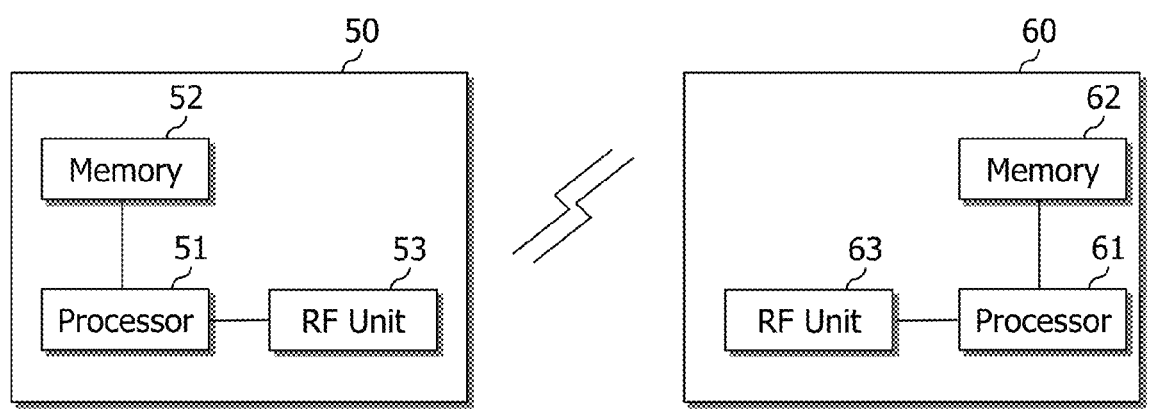
FIG. 9 is a block diagram showing a wireless communication system according to an embodiment of the present invention.

FIG. 9 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method of performing a random access procedure in a wireless communication system, the method comprising:
   configuring, by a terminal, a first medium access control (MAC) entity for a first base station;

configuring, by the terminal, a second MAC entity for a second base station, wherein the first MAC entity and the second MAC entity are operated independently of each other;

receiving, by the first MAC entity of the terminal and from the first base station, an order to instruct the first MAC entity to trigger a first random access procedure;

receiving information on an allocation of a delay-tolerable random access preamble dedicated to the first base station;

determining whether a second random access procedure is triggered by the second MAC entity on a same subframe where the first random access procedure is triggered, before receiving the information on the allocation of the delay-tolerable random access preamble dedicated to the first base station;

selecting the second random access procedure if the first random access procedure and the second random access procedure are concurrently triggered in the single subframe and if the delay-tolerable random access preamble is used for the first random access procedure; and transmitting a second random access preamble for the selected second random access procedure in the single subframe to the second base station.

2. The method of claim 1, further comprising, after transmitting the second random access preamble for the second random access procedure to the second base station, transmitting the delay-tolerable random access preamble for the first random access procedure.

3. The method of claim 1, wherein the first random access procedure is triggered when specific fields in control information regarding a control channel and received from the first base station are set to a specific value.

4. The method of claim 1, wherein the first random access procedure is a non-contention based random access procedure, and the second random access procedure is a contention based random access procedure.

5. A wireless device for performing a random access procedure in a wireless communication system, the wireless device comprising:
a radio frequency (RF) unit configured to transmit and receive a radio signal; and
a processor operatively coupled to the RF unit, wherein the processor is configured to:
configure a first medium access control (MAC) entity for a first base station;
configure a second MAC entity for a second base station, wherein the first MAC entity and the second MAC entity are operated independently of each other;
receive, from the first base station, an order to instruct the first MAC entity to trigger a first random access procedure;
receive information on an allocation of a delay-tolerable random access preamble dedicated to the first base station;
determine whether a second random access procedure is triggered by the second MAC entity on a same subframe where the first random access procedure is triggered, before receiving the information on the allocation of the delay-tolerable random access preamble dedicated to the first base station;
select the second random access procedure if the first random access procedure and the second random access procedure are concurrently triggered in the single subframe and if the delay-tolerable random access preamble is used for the first random access procedure; and
transmit a second random access preamble for the selected second random access procedure in the single subframe to the second base station.

6. The wireless device of claim 5, wherein the first random access procedure is a non-contention based random access procedure, and the second random access procedure is a contention based random access procedure.

\* \* \* \* \*